US010880016B2

(12) United States Patent
Persson et al.

(10) Patent No.: US 10,880,016 B2
(45) Date of Patent: Dec. 29, 2020

(54) CONNECTING ULTRASOUND-INCAPABLE CLIENT DEVICES TO COLLABORATION DEVICES

(71) Applicant: Cisco Technology, Inc., San Jose, CA (US)

(72) Inventors: Lars Johan Persson, Blommenholm (NO); Dan Peder Eriksen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 15/978,554

(22) Filed: May 14, 2018

(65) Prior Publication Data

US 2019/0280783 A1 Sep. 12, 2019

Related U.S. Application Data

(60) Provisional application No. 62/641,514, filed on Mar. 12, 2018.

(51) Int. Cl.
*H04B 11/00* (2006.01)
*H04W 4/021* (2018.01)
*H04W 4/38* (2018.01)
*H04W 4/70* (2018.01)

(52) U.S. Cl.
CPC ............ *H04B 11/00* (2013.01); *H04W 4/022* (2013.01); *H04W 4/38* (2018.02); *H04W 4/70* (2018.02)

(58) Field of Classification Search
CPC ........ H04B 11/00; H04W 4/022; H04W 4/38; H04W 4/70; H04W 4/021; H04W 4/80
See application file for complete search history.

(56) References Cited

U.S. PATENT DOCUMENTS 9,167,386 B2 10/2015 Valaee et al.
9,451,414 B1 9/2016 Birkenes et al.
9,781,575 B1 10/2017 Wan et al.
2011/0010093 A1 1/2011 Patridge et al.
(Continued)

OTHER PUBLICATIONS

Bolliger, "Robust Indoor Positioning through Adaptive Collaborative Labeling of Location Fingerprints", Doctoral Thesis, ETH zürich, Research Collection, ETH Library, 2011, 184 pgs.
(Continued)

*Primary Examiner* — Daniel Pihulic
(74) *Attorney, Agent, or Firm* — Edell, Shapiro & Finnan, LLC

(57) ABSTRACT

In one example embodiment, a server obtains a labeled fingerprint of an ultrasound-capable client device. Based on the labeled fingerprint, the server determines that the ultrasound-capable client device is in physical proximity with a collaboration endpoint. The server subsequently obtains an unlabeled fingerprint of an ultrasound-incapable client device. Based on the unlabeled fingerprint and the labeled fingerprint, the server determines that the ultrasound-incapable client device is a meeting attendee device for a collaboration meeting to which the collaboration endpoint is connected. In response to determining that the ultrasound-incapable client device is the meeting attendee device for the collaboration meeting, the server connects the ultrasound-incapable client device to the collaboration endpoint.

20 Claims, 8 Drawing Sheets

(56) References Cited

U.S. PATENT DOCUMENTS

| | | | | |
|---|---|---|---|---|
| 2017/0245106 | A1 | 8/2017 | Connelly et al. | |
| 2019/0280783 | A1* | 9/2019 | Persson ................. | H04W 4/022 |

OTHER PUBLICATIONS

Mascharka, et al., "Machine Learning for Indoor Localization Using Mobile Phone-Based Sensors", Department of Mathematics and Computer Science, Drake University, May 22, 2015, 6 pgs.

Wang, et al., "CSI-based Fingerprinting for Indoor Localization: A Deep Learning Approach", IEEE Transactions on Vehicular Technology, Mar. 23, 2016, 14 pgs.

Yu, "An Efficient Wi-Fi RSS Indoor Positioning System and Its Client-Server Implementation", Master's Thesis, University of Toronto, 2013, 114 pgs.

Unknown Author, "Indoor Positioning & Services" White Paper, infsoft GmbH, 2017, 27 pgs.

Krumm, John et al., "The NearMe Wireless Proximity Server", UbiComp 2004, The Sixth International Conference on Ubiquitous Computing, pp. 283-300, Sep. 7-10, 2004, 18 pages.

Krumm, John et al., "The NearMe Wireless Proximity Server", https://www.slideserve.com/lave/the-nearme-wireless-proximity-server, Nov. 3, 2016, 26 pages.

* cited by examiner

300

500

| AMOUNT OF DATA | 4 HOURS | 1 DAY | REFERENCE CONVENTIONAL ALGORITHM (10 DAYS) |
|---|---|---|---|
| SIZE OF DATA SET [MB] | 3.3 | 42 | |
| SITES / ISLANDS | 140 | 302 | |
| CODECS / ROOMS | 204 | 735 | |
| MEDIAN DATA POINTS PER SITE | 11 | 42 | |
| MEAN ACCURACY | 99.3% | 95.5% | 87% |

FIG.5

CONNECTING ULTRASOUND-INCAPABLE CLIENT DEVICES TO COLLABORATION DEVICES

CROSS REFERENCE TO RELATED APPLICATION

This application claims priority to U.S. Provisional Application No. 62/641,514 filed Mar. 12, 2018, the entirety of which is incorporated herein by reference.

TECHNICAL FIELD

The present disclosure relates to collaboration meeting systems and services.

BACKGROUND

Collaboration endpoint devices that enable users to join a collaboration meeting are typically installed in meeting rooms. Users of these collaboration devices often bring their own mobile client devices (e.g., smartphones, tablets, laptops, etc.) to connect to the meeting. Today, ultrasound is often used as the underlying technology to establish whether there is physical proximity between a mobile client device and a collaboration device. The collaboration device emits an ultrasound signal, which if received and decoded properly by a client device, presents "proof" of physical proximity to a collaboration endpoint device in a meeting room.

More specifically, the collaboration endpoint device emits an ultrasound signal containing a secret that includes information that effectively enables the mobile client device to establish an Internet Protocol (IP) connection to the collaboration endpoint over a wireless (or wired) IP network. If the mobile client device can receive and present this secret, it is considered to be in physical proximity of the corresponding collaboration endpoint. If physical proximity is established, the mobile client may pair with the collaboration endpoint and obtain access to a set of privileged features that are designed to be available only for a user in physical proximity with the collaboration device. Examples of such features include wireless sharing of content to the collaboration endpoint, control of the collaboration endpoint, etc.

BRIEF DESCRIPTION OF THE DRAWINGS

FIG. 5 illustrates empirical results of an experiment that uses similar methods to those described in FIGS. 4A and 4B to automatically connect ultrasound-incapable client devices to collaboration endpoints, according to an example embodiment.

DESCRIPTION OF EXAMPLE EMBODIMENTS

Overview

In one example embodiment, a server obtains a labeled fingerprint of an ultrasound-capable client device. The labeled fingerprint includes location-relevant information identifying at least one wireless access point as being in a range of the ultrasound-capable client device, and a label identifying a collaboration endpoint from which the ultrasound-capable client device has received an ultrasound pairing signal. Based on the labeled fingerprint, the server determines that the location-relevant information indicates that the ultrasound-capable client device is in physical proximity with the collaboration endpoint.

Subsequently, the server obtains an unlabeled fingerprint of an ultrasound-incapable client device. The unlabeled fingerprint includes further location-relevant information identifying the at least one wireless access point as being in a range of the ultrasound-incapable client device. Based on the unlabeled fingerprint and the labeled fingerprint, the server determines that the further location-relevant information indicates that the ultrasound-incapable client device is a meeting attendee device for a collaboration meeting to which the collaboration endpoint is connected. In response to determining that the ultrasound-incapable client device is the meeting attendee device for the collaboration meeting, the server connects the ultrasound-incapable client device to the collaboration endpoint.

Example Embodiments

Figure 1:
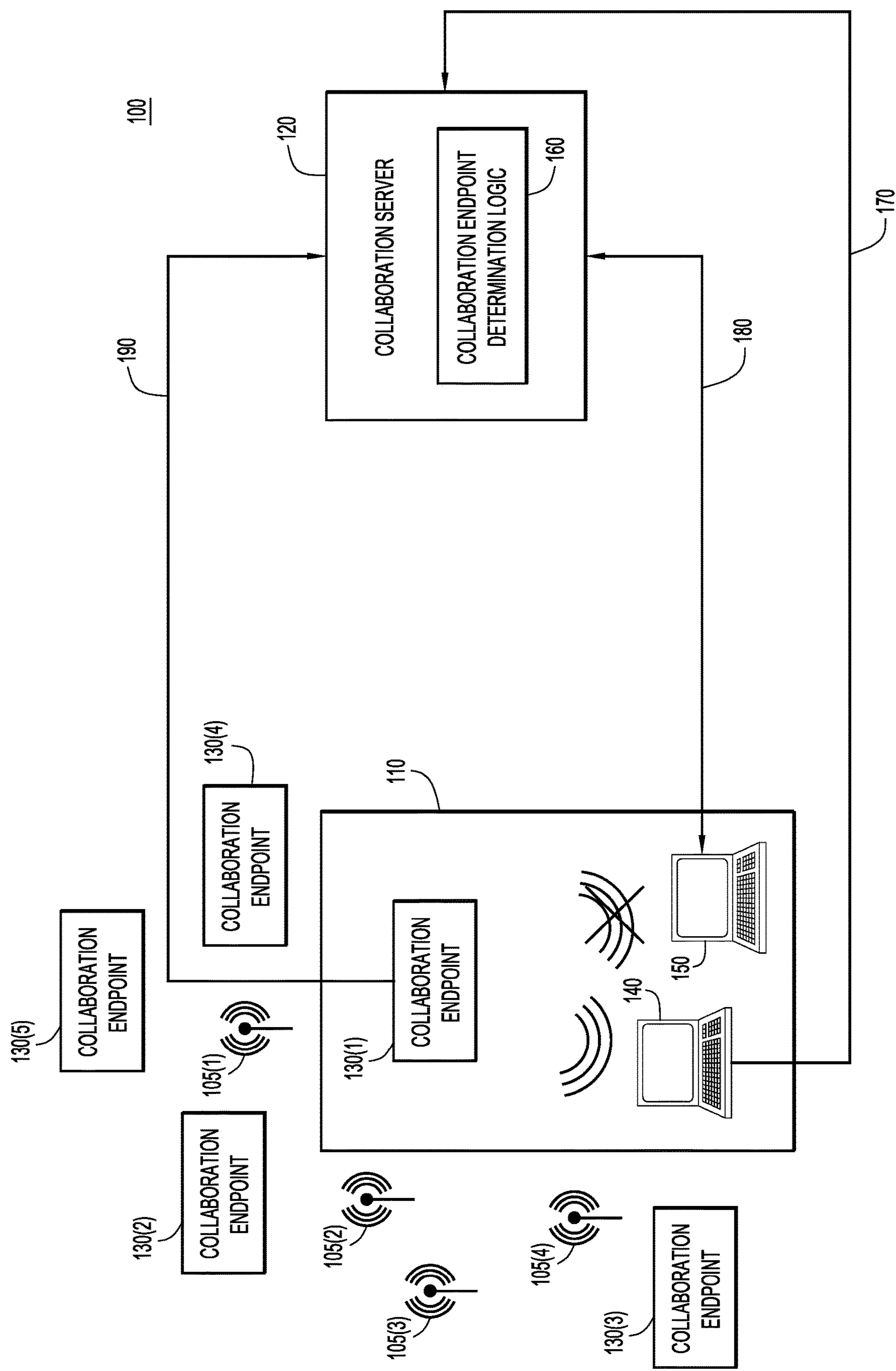
FIG. 1 illustrates a system for the automated connection of ultrasound-incapable client devices to collaboration endpoints, according to an example embodiment.

FIG. 1 illustrates a system 100 configured to automatically connect ultrasound-incapable client devices to a collaboration endpoint. System 100 includes wireless Access Points (APs) 105(1)-105(4), a collaboration area (e.g., a meeting room) 110, collaboration server 120, and a plurality of collaboration endpoints 130(1)-130(5). Collaboration area 110 includes a collaboration device/endpoint (e.g., a stationary/installed telepresence screen) 130(1), as well as ultrasound-capable client device 140 and ultrasound-incapable client device 150. Collaboration server 120 may provide a cloud collaboration service that facilitates/hosts a collaboration meeting using one or more of the plurality of collaboration endpoints 130(1)-130(5).

Client devices 140 and 150 may be portable devices (e.g., laptops, smartphones, etc.) configured to run a collaboration application (e.g., Cisco Systems, Inc.'s Spark® collaboration application). The collaboration application enables the client devices 140 and 150 to access the cloud collaboration service (i.e., collaboration server 120) that facilitates/hosts the collaboration meeting. The collaboration meeting may be web-based and include remote participants, or may be local and include only participants in the collaboration area 110.

Collaboration server 120 may coordinate and control the distribution of rotating secrets (e.g., tokens) to collaboration endpoints 130(1)-130(5). Collaboration endpoint 130(1), for example, may periodically emit an ultrasound pairing signal that includes a rotating secret (e.g., token) that uniquely identifies collaboration endpoint 130(1). When ultrasound-capable client device 140 enters the collaboration area 110, the ultrasound-capable client device 140 detects and processes this ultrasound pairing signal and, in response, establishes an Internet Protocol (IP) connection to the collaboration endpoint 130(1) over a wireless (or wired) IP network. The ultrasound-capable client device 140 sends the (decoded) secret to the collaboration server 120. Upon receiving the secret, the collaboration server 120 may determine the collaboration endpoint (here, collaboration endpoint 130(1)) to which the secret corresponds. Collaboration server 120 may thus help ultrasound-capable client device 140 establish an IP connection to collaboration endpoint 130(1), for example, by informing the collaboration endpoint 130(1) that the ultrasound-capable client device 140 is in physical proximity with the collaboration endpoint 130(1).

Once physical proximity between the ultrasound-capable client device 140 and the collaboration endpoint 130(1) has been established, the ultrasound-capable client device 140 may pair with the collaboration endpoint 130(1) and obtain access to a set of privileged features that are designed to be available only for a user in physical proximity with the collaboration endpoint 130(1). For example, once paired, the ultrasound-capable client device 140 may share a presentation on the display surface of the collaboration endpoint 130(1), control the collaboration endpoint 130(1), etc.

Unlike the ultrasound-capable client device 140, ultrasound-incapable client device 150 cannot detect and process the ultrasound pairing signal emitted from the collaboration endpoint 130(1). There are many possible reasons why ultrasound-incapable client device 150 is unable to detect and process the ultrasound pairing signal. First, hardware (e.g., a microphone) on the ultrasound-incapable client device 150 may not be designed to capture signals in the ultrasonic frequency band. Second, microphone audio signal processing performed by the Operating System (OS) on the ultrasound-incapable client device 150 may significantly distort the ultrasound pairing signal. Third, "buggy" OS drivers on the ultrasound-incapable client device 150 may prevent the ultrasound-incapable client device 150 from processing the ultrasound pairing signal. Fourth, ultrasound interference may degrade the ultrasound pairing signal and prevent pairing.

Therefore, conventionally, the ultrasound-incapable client device 150 would not be able to establish physical proximity to (or pair with) the collaboration endpoint 130(1). As such, the ultrasound-incapable client device 150 would be unable to obtain access to certain privileged features such as sharing a presentation on the display surface of the collaboration endpoint 130(1), controlling the collaboration endpoint 130(1), etc. For example, ultrasound-incapable client device 150 would not be able to share a presentation wirelessly via the collaboration endpoint 130(1) to display to other local participants in the same room. Accordingly, there is a need to improve conventional techniques for establishing physical proximity between client devices and collaboration endpoints.

Systems that estimate indoor position by sampling the Wi-Fi® radio frequency environment of a client device are ubiquitous. Such services utilize Wi-Fi transmissions to determine a general indoor position (e.g., of a shopping mall) through the use of machine learning approaches. However, these systems are not accurate unless the location has been previously mapped (e.g., with x-y coordinates) to provide a grid of known locations and the associated Wi-Fi environment. This approach does not provide an adequate solution for establishing physical proximity between collaboration endpoints and ultrasound-incapable client devices because it is labor-intensive and must be performed manually for each location to be navigated.

Accordingly, collaboration endpoint determination logic 160 is provided on collaboration server 120 to automatically establish physical proximity between collaboration endpoints and ultrasound-incapable client devices. Briefly, collaboration endpoint determination logic 160 uses information that is relevant to the location of the ultrasound-capable client device 140 to subsequently determine/predict that ultrasound-incapable client device 150 is in physical proximity to the same collaboration endpoint 130(1). In one example, the solution described herein establishes a location of the ultrasound-incapable client device 150 relative to the collaboration endpoint 130(1), rather than an absolute (e.g., x-y coordinate) location of the ultrasound-incapable client device 150.

Initially, collaboration server 120 may obtain a labeled fingerprint of ultrasound-capable client device 140. The labeled fingerprint includes (1) location-relevant information identifying at least one wireless AP (e.g., wireless AP 105(1)) as being in a range of the ultrasound-capable client device 140, and (2) a label identifying collaboration endpoint 130(1), from which the ultrasound-capable client device 140 has received the ultrasound pairing signal. The labeled fingerprint may identify wireless AP 105(1) using the Basic Service Set Identifier (BSSID) of wireless AP 105(1). It will be appreciated that the location-relevant information may identify more than one wireless AP.

The location-relevant information may affect the quality of the labeled fingerprint, and may include any information available on the ultrasound-capable client device 140 that may be statistically relevant for determining proximity to collaboration endpoint 130(1). In one example, the location-relevant information may include an estimate of a distance between the ultrasound-capable client device 140 and the collaboration endpoint 130(1). The ultrasound-capable client device 140 may determine the distance, for example, based on the quality of the ultrasound pairing signal. If the ultrasound-capable client device 140 is in closer physical proximity to a speaker of the collaboration endpoint 130(1), the ultrasound-capable client device 140 may detect the ultrasound pairing signal with higher quality. If the ultrasound-capable client device 140 is in further physical proximity to the speaker of the collaboration endpoint 130(1), the ultrasound-capable client device 140 may detect the ultrasound pairing signal with lower quality.

In another example, the location-relevant information may include a timestamp indicating a time at which the labeled fingerprint was sent. Based on the timestamp, the collaboration server 120 may determine whether the labeled fingerprint was sent at the beginning, middle, or end of a collaboration meeting. For example, the collaboration server 120 may use the timestamp to determine the start and end times of the collaboration meeting. The collaboration server 120 may assign location-relevant information of labeled fingerprints sent at the beginning or end of the collaboration meeting a lower weight than location-relevant information of labeled fingerprints sent at the middle of the collaboration meeting. The rationale for this is that the ultrasound-capable client device 140 may be more likely to be in motion at the beginning or end of a collaboration meeting. For instance, the user of ultrasound-capable client device 140 might arrive late, leave early, switch seats, etc. In one example, the collaboration server 120 may discard labeled fingerprints that were sent at the beginning or end of a collaboration meeting (e.g., by assigning such labeled fingerprints a weight of zero).

The collaboration server 120 may also use the timestamp to determine whether two labeled fingerprints sent from ultrasound-capable client device 140 correspond to the same or different collaboration meetings. Because wireless AP signals can fluctuate heavily over small time periods, even a small change in location in a meeting room can generate wildly different Wi-Fi signals. As such, without the time-stamp, it may be difficult for the collaboration server 120 to determine whether ultrasound-capable client device 140 is in the same meeting (and physical position), or in a different meeting (and physical position) at a different time in the same meeting room. The collaboration server 120 may use this information to better approximate the physical proximity of ultrasound-capable client device 140 to a collaboration endpoint 130(1).

In yet another example, the labeled fingerprint may include a user identifier associated with a user of the ultrasound-capable client device 140. Based on the user identifier, the collaboration server 120 may determine that the user and collaboration endpoint have been invited to the same collaboration meeting (e.g., by referencing meeting attendee information). This information may subsequently help the collaboration server 120 to determine which weights to assign the labeled fingerprints received from ultrasound-capable client device 140. Thus, the user identifier may be used as a quality indicator for the labeled data. Since the labeled fingerprints vary in quality/reliability, including such quality indicators in the labeled fingerprints may improve performance.

For example, if ultrasound-capable client device 140 both presents the secret and belongs to a user that is scheduled to be in a meeting using collaboration endpoint 130(1), the labeled fingerprint may be associated a relatively strong weight. A weaker weight may be assigned to a label fingerprint received from an ultrasound-capable device that only provides the secret. This is because collaboration endpoint 130(1) might receive the secret from an ultrasound-capable client device that incidentally passes by the meeting room hosting collaboration endpoint 130(1) and thereby automatically pairs with collaboration endpoint 130(1). In another example, collaboration server 120 may also use a social graph to determine whether the user often interacts with other invitees to the collaboration meeting and is therefore more likely to be in the meeting.

The location-relevant information may also/alternatively include other real-world characteristics that are useful for determining the physical proximity of the ultrasound-capable client device 140 to the collaboration endpoint 130(1). For example, the location-relevant information may include information pertaining to wireless AP 105(1) (which was identified as being in a range of the ultrasound-capable client device 140), such as a Received Signal Strength Indicator (RSSI), Service Set Identifier (SSID), frequency/channel, and/or BSSID. The 48-bit BSSID has a well-defined structure, which may enable the extraction and utilization of information such as the vendor name (which may impact RF characteristics) to improve the data quality. Since a single wireless AP may transmit multiple BSSIDs simultaneously, collaboration server 120 may determine whether multiple BSSIDs are transmitted from the same wireless AP based on the BSSID and RSSI.

The location-relevant information may also/alternatively include information pertaining to the ultrasound-capable client device 140, such as make, model, OS type and version, application version (which may impact the Radio Frequency (RF) measurements), etc. The location-relevant information may further include detailed Wi-Fi data (e.g., Channel State Information (CSI) data), other location-relevant data (e.g., mobile base station data, Global Positioning System (GPS) data, Bluetooth® beacons, etc.), and/or environmental sensors (e.g., pressure, temperature, etc.). Although barometers and GPS sensors are typically not available on modern laptops, Wi-Fi scanning is available on the vast majority of mobile devices. The location-relevant information may additionally include a client identifier, which may correlate with the preferred position of a user within collaboration area 110.

In still another example, collaboration endpoint 130(1) may act as a wireless transmitter (e.g., Wi-Fi or Bluetooth transmitter). In this example, ultrasound-capable client device 140 may perform a Wi-Fi scan and determine that the collaboration endpoint 130(1) itself advertises a Wi-Fi AP. Ultrasound-capable client device 140 may also include this information as location-relevant information in the labeled fingerprint.

Optionally, one or more data fields of the location-relevant information may be anonymized. The anonymization may retain the distinguishability of these data fields so as to maintain the usefulness of the location-relevant information in establishing physical proximity. For example, the clear text value of the BSSID may include sensitive information since it can be used to determine the vendor (and possibly the model) of wireless AP 105(1). To avoid sending such sensitive location-relevant information to collaboration server 120, a cryptographically hashed version of the BSSID may be substituted for the clear text value. Ultimately, determining how much (and which) location-relevant data to anonymize may involve considering a privacy/accuracy trade-off.

As represented by 170, collaboration server 120 may obtain the labeled fingerprint of the ultrasound-capable client device 140 after the ultrasound-capable client device 140 has paired with the collaboration endpoint 130(1) via ultrasound techniques. Ultrasound-capable client device 140 need not explicitly make a peer-to-peer connection to the collaboration endpoint 130(1) in order to advertise itself to the collaboration server 120. In addition, there is no need for a dedicated additional piece of hardware, since the ability to transmit the ultrasound secret is already built into the collaboration endpoint 130(1).

Based on the labeled fingerprint of ultrasound-capable client device 140, the collaboration server 120 may determine that the location-relevant information indicates that the ultrasound-capable client device 140 is in physical proximity with the collaboration endpoint 130(1). The collaboration server 120 may make this determination by reading the label in the labeled fingerprint identifying collaboration endpoint 130(1). Over time, the collaboration server 120 may amass a large enough data set of labeled fingerprints of many ultrasound-capable client devices (not shown) to train a machine learning process which is part of collaboration endpoint determination logic 160. The performance of the machine learning process may improve with the amount and variety of location-relevant information with which the machine learning process is trained.

Once trained, the machine learning process may determine to which collaboration device a client device is in physical proximity based on an unlabeled fingerprint (i.e., a fingerprint that does not include a label identifying a collaboration endpoint). That is, the machine learning process may select a collaboration endpoint for an unlabeled fingerprint based on similar labeled fingerprints. The machine learning process may be a supervised machine learning process (e.g., Logistic Regression, Support Vector Machine, Neural Network, etc.). The collaboration server 120 may train the machine learning process offline, once the collaboration server 120 has obtained a sufficient number and variety of labeled fingerprints. Dimensionality reduction may be used to refine the machine learning process.

After ultrasound-incapable client device 150 enters the collaboration area 110 (e.g., any time after the machine learning process has been trained based on the labeled fingerprint), the collaboration server 120 may obtain an unlabeled fingerprint of the ultrasound-incapable client device 150. In the example of FIG. 1, the unlabeled fingerprint includes further location-relevant information identifying wireless AP 105(1) (which was previously identified in the labeled fingerprint of the ultrasound-capable client device 140) as being in a range of the ultrasound-incapable client device.

Based on the unlabeled fingerprint and the labeled fingerprint, the collaboration server 120 determines that the ultrasound-incapable client device 150 is a meeting attendee device for a collaboration meeting to which the collaboration endpoint 130(1) is connected. Specifically, the machine learning process knows that wireless AP 105(1) was previously identified in the labeled fingerprint of the ultrasound-capable client device 140, and that the collaboration endpoint 130(1) was identified in the label of the labeled fingerprint. Based on this information, the machine learning process predicts that the ultrasound-incapable client device 150, having identified wireless AP 105(1) in the unlabeled fingerprint, is in physical proximity to the collaboration endpoint 130(1). It will be appreciated that the machine learning process may take into account many other labeled fingerprints when making this prediction. Moreover, the labeled and/or unlabeled fingerprints may include other location-relevant information in addition to the wireless AP 105(1), as detailed above.

A semi-automated scheme for obtaining labeled fingerprints is represented by 180. The collaboration server 120 may send, to ultrasound-incapable client device 150, an indication of a plurality of collaboration endpoints 130(1)-130(5). The plurality of collaboration endpoints 130(1)-130(5) may be candidate collaboration endpoints that the machine learning process has identified as potentially being in physical proximity to the ultrasound-incapable client device 150.

Upon receiving the indication of the plurality of collaboration endpoints 130(1)-130(5), the ultrasound-incapable client device 150 may present the plurality of collaboration endpoints 130(1)-130(5) to the user of ultrasound-incapable client device 150. The ultrasound-incapable client device 150 may, for example, display a list of the plurality of collaboration endpoints 130(1)-130(5), sorted by likelihood of physical proximity. The list may include the names of the plurality of collaboration endpoints 130(1)-130(5) according to an accepted naming scheme. The user, who knows that s/he is in physical proximity to collaboration endpoint 130(1), may select collaboration endpoint 130(1) using a software application (e.g., a graphical user interface) on the client device.

The collaboration sever 120 may obtain, from ultrasound-incapable client device 150, the user selection of collaboration endpoint 130(1). In effect, this user selection provides a label for the previously obtained unlabeled fingerprint, and this label may be added to the training data set for collaboration endpoint 130(1). In other words, the user selection of collaboration endpoint 130(1) may be used to train the machine learning process for subsequently obtained unlabeled fingerprints. For example, based on the user selection of the collaboration endpoint, the collaboration server 120 may determine that a second ultrasound-incapable client device is a meeting attendee device for a subsequent collaboration meeting to which the collaboration endpoint 130(1) is connected.

In another example, as represented by 190, collaboration server 120 may also obtain a second labeled fingerprint of collaboration endpoint 130(1). The second labeled fingerprint includes location-relevant information of the collaboration endpoint, and a label identifying the collaboration endpoint. For example, if Wi-Fi capable, the collaboration endpoint 130(1) may scan its Wi-Fi environment to determine a wireless AP (e.g., wireless AP 105(1)) in a range of the collaboration endpoint 130(1), and may identify the wireless AP 105(1) as location-relevant information in the second labeled fingerprint. If the collaboration endpoint 130(1) has other sensors (e.g., environmental or location-relevant sensors), data from these sensors may also be included in the (self) labeled fingerprint sent from the collaboration endpoint 130(1). Based on the second labeled fingerprint, the collaboration server 120 may determine that the ultrasound-incapable client device is a meeting attendee device for the collaboration meeting to which the collaboration endpoint 130(1) is connected. For example, the collaboration server 120 may train the machine learning process using this second fingerprint in addition to the labeled fingerprint of the ultrasound-capable client device 140.

Accordingly, there are at least three different schemes by which the collaboration server 120 may obtain labeled fingerprints: ultrasound as represented by 170; manual selection from a prioritized list as represented by 180; and self-reporting by the collaboration endpoint as represented by 190.

In response to determining that the ultrasound-incapable client device is the meeting attendee device for the collaboration meeting, the collaboration server 120 may connect the ultrasound-incapable client device 150 to the collaboration endpoint 130(1). Unlike conventional approaches, this enables the ultrasound-incapable client device 150 to obtain access to certain privileged features such as sharing a presentation on the display surface of the collaboration endpoint 130(1), controlling the collaboration endpoint 130(1), etc.

Figure 2:
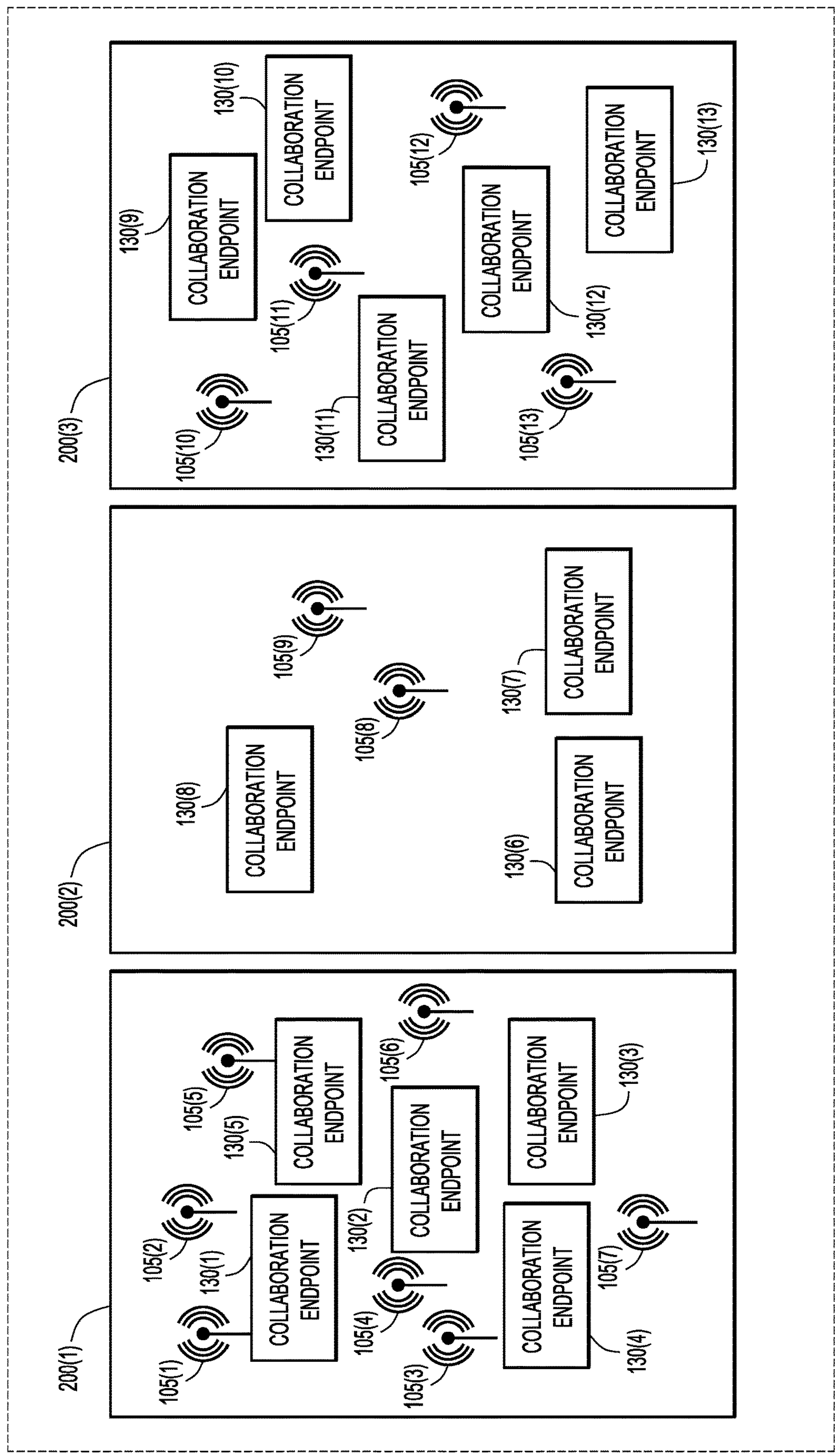
FIG. 2 illustrates a series of disjoint wireless access sites configured for the automated connection of ultrasound-incapable client devices to collaboration endpoints, according to an example embodiment.

FIG. 2 illustrates a series of disjoint wireless access zones 200(1)-200(3) which facilitate the automated connection of ultrasound-incapable client devices to collaboration endpoints. Disjoint wireless access zone 200(1) includes collaboration endpoints 130(1)-130(5) and wireless APs 105(1)-105(7). Disjoint wireless access zone 200(2) includes collaboration endpoints 130(6)-130(8) and wireless APs 105(8) and 105(9). Disjoint wireless access zone 200(3) includes collaboration endpoints 130(9)-130(13) and wireless APs 105(10)-105(13).

Disjoint wireless access zone 200(1) may be a building, and collaboration endpoints 130(1)-130(5) and wireless APs 105(1)-105(7) may be located within that building. Similarly, disjoint wireless access zone 200(2) may be another building, and collaboration endpoints 130(6)-130(8) and wireless APs 105(8) and 105(9) may be located within that other building. Disjoint wireless access zone 200(3) may be, for example, multiple buildings that are so close to each other that there is an overlap in wireless AP coverage (i.e., collaboration endpoints 130(9)-130(13) and wireless APs 105(10)-105(13) may be distributed throughout multiple buildings).

Disjoint wireless access zones 200(1)-200(3) may be defined by segmenting a very large number of labeled fingerprints collected from an uncontrolled number of multiple different physical locations. In one example, the collaboration server 120 may determine that the ultrasound-incapable client device 150 and the collaboration endpoint 130(1) are located in disjoint wireless access zone 200(1). The machine learning process may identify disjoint wireless access zones 200(1)-200(3) using a large number of labeled fingerprints that contain the wireless AP BSSIDs.

Once the collaboration server 120 has identified disjoint wireless access zones 200(1)-200(3), the machine learning process may be trained on a per-zone basis. For instance, a first machine learning classifier may be trained for disjoint wireless access zone 200(1), a second machine learning classifier may be trained for disjoint wireless access zone 200(2), and a third machine learning classifier may be trained for disjoint wireless access zone 200(3). For each disjoint wireless access zone 200(1)-200(3), RSSI, frequency of APs, and other information collected in the labeled fingerprints as outlined above may be used as input features for the local machine learning classifiers.

Using disjoint wireless access zones greatly improves the computational tractability of the machine learning process, minimizing processing requirements while improving processing speed. For example, the input features for the classifier of a disjoint wireless access zone may be the superset of all input features that are available in the data set submitted by client devices that have sent labeled fingerprints from a disjoint wireless access zone. In one specific example, if a disjoint wireless access zone has fifty wireless APs, there may be fifty RSSI values and fifty frequency/channel values for each record (along with other data parameters that are part of the data set). If a given labeled fingerprint only includes data for twelve of those APs, the other thirty-eight may be assigned a very low RSSI value (e.g., corresponding to zero or close to zero signal strength) for those data parameters in that data record. Missing values may also be addressed via imputation techniques (e.g., replacing missing AP data in a data record with the mean of the AP data across all fingerprints for the wireless access zone in question). A large scale, computationally tractable implementation may comprise millions of collaboration devices, BSSIDs, and labeled fingerprints.

Figure 3:
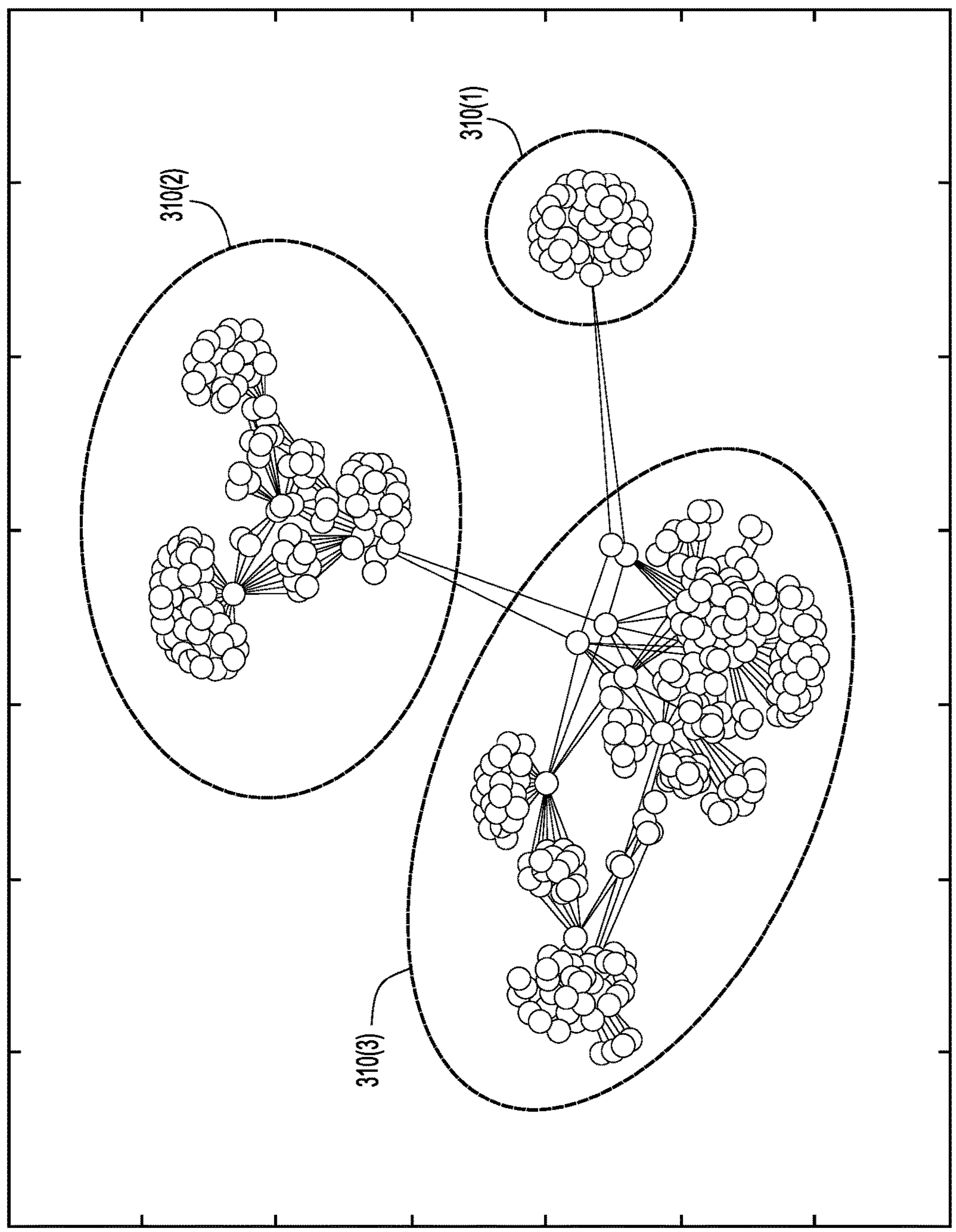
FIG. 3 illustrates a disjoint wireless access site with particularly high access point complexity, according to an example embodiment.

FIG. 3 illustrates disjoint wireless access zone 300 having particularly high access point complexity. Disjoint wireless access zone 300 includes codecs and wireless APs of varying counts having edges/connections of varying energies. As shown, even a disjoint wireless access zone may occasionally become too large/complex due to, for example, client devices that advertise ad-hoc APs and move across buildings or do not sufficiently randomize their BSSIDs. Here, although BSSIDs are expected to be unique, disjoint wireless access zone 300 has grown so complex that it is suspected that BSSIDs may be duplicated. That is, client devices that advertise ad-hoc APs may not present unique BSSIDs in disjoint wireless access zone 300.

To combat the suspected problem of BSSIDs not being sufficiently randomized by ad-hoc APs, the BSSID may be augmented with SSIDs to provide further uniqueness. Considering BSSID and SSID jointly may address the problem of ad-hoc APs (if that is the underlying reason for the magnitude of disjoint wireless access zone 300). Highly complex wireless access zones could potentially also arise in large and dense physical areas where a large number of customers is using the system. Other possible causes of the high complexity of disjoint wireless access zone 300 include a pathologically complex Wi-Fi and collaboration device infrastructure, and/or strong APs connecting multiple buildings (e.g., across a campus).

If the system is very dense/large, some disjoint wireless access zones (e.g., disjoint wireless access zone 300) may grow too large and require segmentation. Here, because disjoint wireless access zone 300 is too large to be treated by a single machine learning classifier, a secondary disjoint wireless access zone segmentation method may be employed. An unsupervised clustering approach (e.g., k Nearest Neighbors (kNN)) may be used for further segmentation to transform disjoint wireless access zone 300 into k (e.g., 2, 3, etc.) smaller disjoint wireless access zones. As shown, disjoint wireless access zone 300 is segmented into smaller disjoint wireless access zones 310(1)-310(3). Smaller disjoint wireless access zones 310(1)-310(3) each have an individual machine learning classifier. An alternative method for further segmentation may use graph methods and involve identifying optimal segmentation boundaries based on centrality metrics (e.g., degree centrality).

Figure 4A:
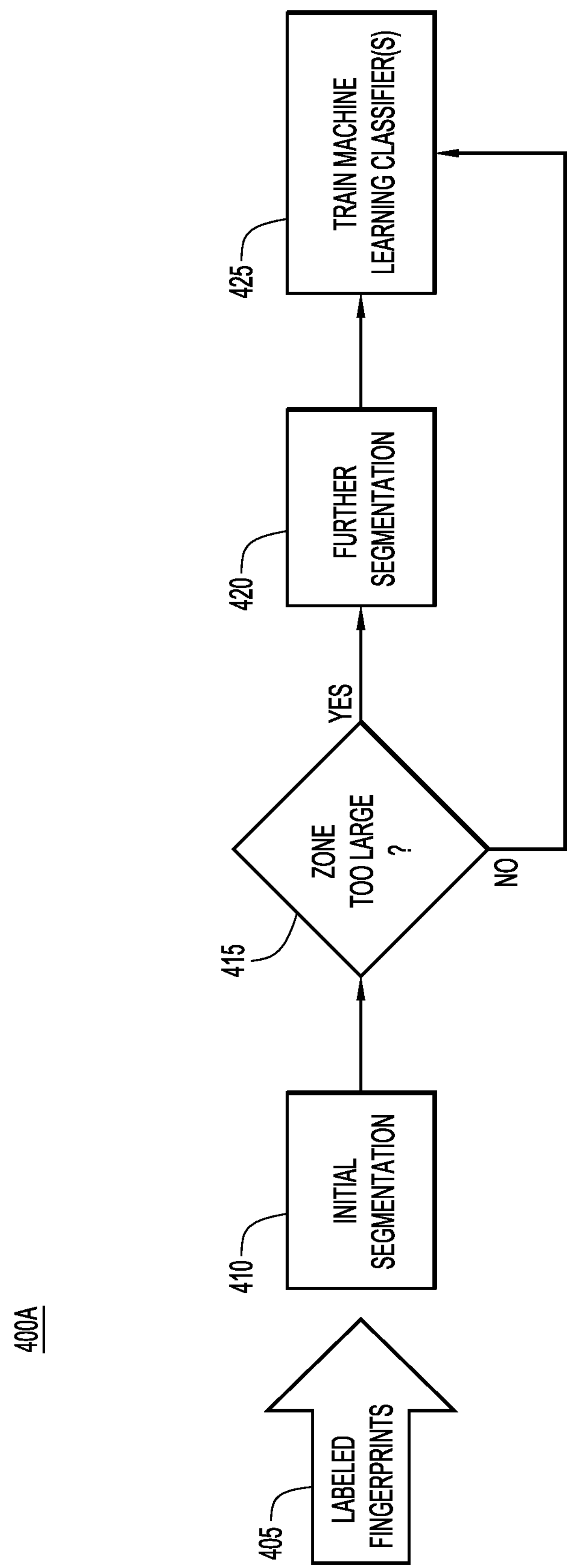
FIG. 4A is a flowchart illustrating a method for training a machine learning classifier that may be used to predict physical proximity between ultrasound-incapable client devices and collaboration endpoints, according to an example embodiment.

FIG. 4A is a flowchart illustrating a method 400A for training a machine learning classifier to predict a physical proximity between ultrasound-incapable client devices and collaboration devices. At 405, the collaboration server 120 obtains labeled fingerprints (e.g., including the labeled fingerprint of ultrasound-capable device 140). This data collection phase may be fully automated, and may not involve any type of a priori mapping of physical locations to collaboration endpoints. Therefore, the amount of data may automatically increase over time.

At 410, the collaboration server 120 performs an initial segmentation to produce a disjoint wireless access zone based on the (presumed) uniqueness of BSSIDs (or, alternatively, both BSSIDs and SSIDs). This data pre-processing greatly enhances the efficiency of the machine learning process. At 415, the collaboration server 120 determines whether the disjoint wireless access zone is still too large according to some complexity measure. The threshold for determining whether the disjoint wireless access zone is too large may depend on the capabilities of the computer hardware implementing method 400A, such as available Central Processing Units, Graphics Processing Units, and/or memory.

If the collaboration server 120 determines that the disjoint wireless access zone is still too large, at 420, the collaboration server 120 performs a further segmentation of the disjoint wireless access zone based on some algorithm (e.g., kNN clustering, graph-based segmentation, etc.). At 425, the collaboration server 120 trains a machine learning classifier for each disjoint wireless access zone using, e.g., Logistic Regression, Support Vector Machine, Neural Network, etc. If, at 415, the collaboration server 120 determines that the disjoint wireless access zone is not too large, the flow proceeds directly to 425, where the collaboration server 120 trains a machine learning classifier for the disjoint wireless access zone.

The wireless AP environment in a building may change over time. This may occur, for example, when an administrator removes/adds/moves wireless APs. Accordingly, the machine learning classifier may be retrained on a fixed time scheduled (e.g., daily), in response to detecting that conditions have changed enough to trigger a retraining, and/or by continuously training and adapting the classifier based on new data records being submitted. A streaming/real-time machine learning process may be used for self-improvement.

Figure 4B:
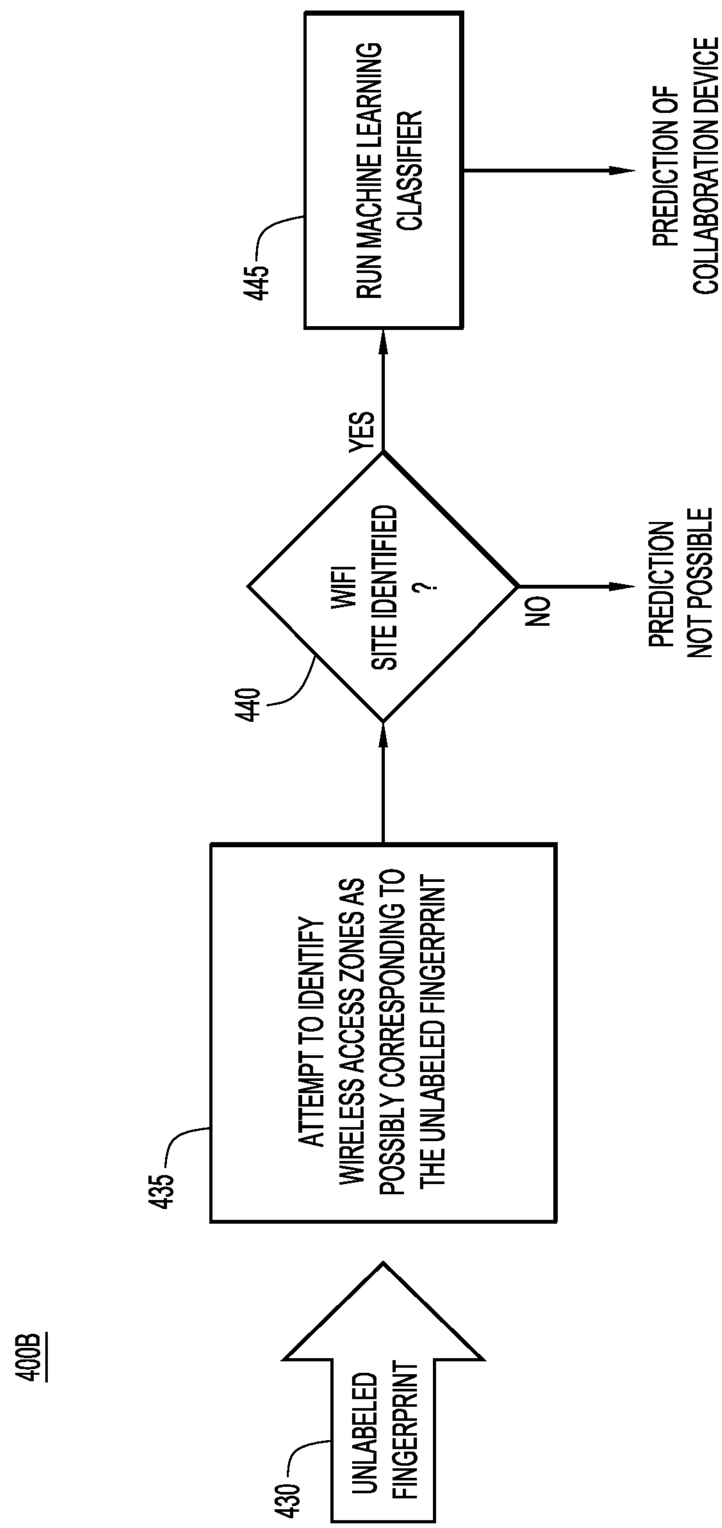
FIG. 4B is a flowchart illustrating a method for using a machine learning classifier to predict physical proximity between ultrasound-incapable client devices and collaboration endpoints, according to an example embodiment.

FIG. 4B is a flowchart illustrating a method 400B for a machine learning classifier to predict a physical proximity between ultrasound-incapable client devices and collaboration devices. At 430, the collaboration server 120 obtains an unlabeled fingerprint of ultrasound-incapable client device 150. At 435, the collaboration server 120 attempts to identify one or more known disjoint wireless access zones as possibly corresponding to the unlabeled fingerprint. This may involve, for example, sorting the wireless APs in an unlabeled fingerprint vector based on RSSI and checking which of the disjoint wireless access zones maps the best. For example, assuming the uniqueness of the BSSIDs, the unlabeled fingerprint RSSI may be sorted according to the RSSIs of the previously detected wireless APs and comparing the RSSIs to the disjoint wireless access zone(s) where the corresponding wireless APs have been observed.

At 440, the collaboration server 120 may determine whether a disjoint wireless access zone has been identified. If the collaboration server 120 determines that a disjoint wireless access zone has not been identified, prediction may not be possible. If the collaboration server 120 determines that a disjoint wireless access zone has been identified, at 445 the collaboration server 120 runs the machine learning classifier corresponding to the identified disjoint wireless access zone to generate a prediction of which collaboration endpoint is in closest physical proximity to the ultrasound-incapable client device 150.

FIG. 5 illustrates a table 500 showing empirical results of an experiment to simulate the connection of ultrasound-incapable client devices to collaboration endpoints. As shown, the techniques presented herein have a marked improvement (e.g., higher mean accuracy) over the reference conventional algorithm. The mean accuracy is a weighted mean of the mean accuracy for the disjoint wireless access zone and the number of codecs/rooms for that disjoint wireless access zone. A 70/30 train/test set split was used, but codecs/rooms with only a single measurement were excluded from the data set for practical reasons. A different data set was used for the conventional algorithm, whose mean accuracy is included only as an indication of the effectiveness of the techniques described herein.

An example results log is provided below. As shown, the overall classification result is above 94% accuracy based on training data collected over the course of a single day.

**********Summary**********

Number of sites: 274

Codecs total: 877 excl, single measurement: 106 (12.1%)

incl, total: 771 (87.9%)

incl, single codec in site: 205 (23.4%)

incl, classified by ML: 566 (64.5%)

ML classifier details:

| bssids | codecs | mean_ accuracy | mean_ accuracy_ weighted | measurements | process_time classify_ms | process_time_ create_data_ms | num_meas_ratio | site_num |
|---|---|---|---|---|---|---|---|---|
| 236 | 198 | 3 | 0.653846 | 1.961538 | 86 | 4.481331 | 1069.103822 | 28.666667 |
| 41 | 85 | 2 | 0.666667 | 1.333333 | 58 | 2.249591 | 554.565617 | 29.000000 |
| 208 | 144 | 8 | 0.666667 | 5.333333 | 78 | 7.003810 | 767.814301 | 9.750000 |
| 228 | 52 | 2 | 0.750000 | 1.500000 | 12 | 13.745242 | 242.892364 | 6.000000 |
| 106 | 33 | 2 | 0.750000 | 1.500000 | 12 | 1.583613 | 158.522324 | 6.000000 |
| 143 | 74 | 3 | 0.750000 | 2.250000 | 39 | 2.627056 | 415.306330 | 13.000000 |
| 184 | 53 | 2 | 0.800000 | 1.600000 | 15 | 1.440948 | 273.461934 | 7.500000 |
| 167 | 118 | 3 | 0.818182 | 2.454545 | 71 | 3.163050 | 636.411451 | 23.666667 |
| 264 | 97 | 2 | 0.833333 | 1.666667 | 39 | 1.706955 | 544.843446 | 19.500000 |
| 265 | 269 | 10 | 0.838710 | 8.387097 | 102 | 15.720769 | 1526.415313 | 10.200000 |
| 248 | 118 | 13 | 0.862069 | 11.206897 | 290 | 27.274944 | 1228.270338 | 22.307692 |
| 114 | 120 | 16 | 0.872180 | 13.954887 | 443 | 64.907709 | 1424.932874 | 27.687500 |
| 189 | 150 | 2 | 0.888889 | 1.777778 | 28 | 1.823131 | 761.516876 | 14.000000 |
| 244 | 105 | 2 | 0.900000 | 1.800000 | 31 | 1.799638 | 532.420173 | 15.500000 |
| 109 | 195 | 6 | 0.909091 | 5.454545 | 107 | 10.111708 | 1250.016670 | 17.833333 |
| 166 | 176 | 5 | 0.911765 | 4.558824 | 112 | 6.193382 | 1049.376920 | 22.400000 |
| 233 | 434 | 9 | 0.913043 | 8.217391 | 229 | 39.198280 | 3062.858102 | 25.444444 |
| 116 | 139 | 8 | 0.916667 | 7.333333 | 118 | 11.410412 | 855.420323 | 14.750000 |
| 209 | 84 | 2 | 0.916667 | 1.833333 | 40 | 1.680162 | 433.541914 | 20.000000 |
| 215 | 63 | 3 | 0.923077 | 2.769231 | 43 | 1.988112 | 323.038006 | 14.333333 |
| 226 | 91 | 4 | 0.933333 | 3.733333 | 97 | 61.755836 | 532.939616 | 24.250000 |
| 187 | 111 | 4 | 0.944444 | 3.777778 | 60 | 3.481522 | 599.444606 | 15.000000 |
| 247 | 1067 | 34 | 0.945813 | 32.157635 | 676 | 405.300371 | 7702.945457 | 19.882353 |
| 160 | 80 | 5 | 0.946429 | 4.732143 | 186 | 7.851101 | 1376.134336 | 37.200000 |
| 154 | 7518 | 212 | 0.951768 | 201.774920 | 4145 | 28672.237437 | 85821.556402 | 19.551887 |
| 230 | 540 | 16 | 0.952381 | 15.238095 | 279 | 190.866879 | 3088.213073 | 17.437500 |
| 140 | 105 | 9 | 0.956522 | 8.608696 | 305 | 134.890169 | 1174.692377 | 33.888889 |
| 220 | 138 | 3 | 0.956522 | 2.869565 | 76 | 49.401911 | 1446.434288 | 25.333333 |
| 93 | 117 | 5 | 0.958333 | 4.791667 | 158 | 6.798052 | 747.898134 | 31.600000 |
| 105 | 433 | 7 | 0.961538 | 6.730769 | 173 | 38.217976 | 3772.953865 | 24.714286 |
| 192 | 304 | 10 | 0.972973 | 9.729730 | 121 | 21.070495 | 1808.392414 | 12.100000 |
| 165 | 489 | 14 | 0.974576 | 13.644068 | 393 | 70.572080 | 3184.442762 | 28.071429 |
| 198 | 118 | 7 | 0.975610 | 6.829268 | 135 | 8.058490 | 816.858544 | 19.285714 |
| 101 | 202 | 5 | 0.979167 | 4.895833 | 159 | 15.261087 | 1896.411603 | 31.800000 |
| 110 | 171 | 6 | 0.981818 | 5.890909 | 183 | 9.830202 | 1145.750267 | 30.500000 |
| 127 | 56 | 2 | 0.984375 | 1.968750 | 213 | 5.901359 | 702.152838 | 106.500000 |
| 210 | 463 | 13 | 0.987097 | 12.832258 | 514 | 102.169555 | 4364.454445 | 39.538462 |
| 186 | 413 | 10 | 0.989691 | 9.896907 | 323 | 39.470238 | 3093.320936 | 32.300000 |
| 222 | 74 | 2 | 1.000000 | 2.000000 | 7 | 21.679972 | 315.735439 | 3.500000 |
| 259 | 174 | 2 | 1.000000 | 2.000000 | 56 | 1.882534 | 903.955724 | 28.000000 |
| 224 | 59 | 2 | 1.000000 | 2.000000 | 35 | 23.682345 | 342.850790 | 17.500000 |

-continued

| bssids | codecs | mean_ accuracy | mean_ accuracy_ weighted | measurements | process_time classify_ms | process_time_ create_data_ms | num_meas_ratio | site_num |
|---|---|---|---|---|---|---|---|---|
| 251 | 49 | 2 | 1.000000 | 2.000000 | 11 | 1.416268 | 220.261125 | 5.500000 |
| 227 | 333 | 6 | 1.000000 | 6.000000 | 123 | 136.207254 | 1977.450824 | 20.500000 |
| 246 | 106 | 3 | 1.000000 | 3.000000 | 48 | 2.663370 | 616.010922 | 16.000000 |
| 240 | 303 | 3 | 1.000000 | 3.000000 | 298 | 20.345768 | 4903.257766 | 99.333333 |
| 237 | 67 | 2 | 1.000000 | 2.000000 | 23 | 1.509883 | 361.935825 | 11.500000 |
| 252 | 102 | 2 | 1.000000 | 2.000000 | 38 | 1.644511 | 507.217433 | 19.000000 |
| 29 | 240 | 2 | 1.000000 | 2.000000 | 26 | 2.917504 | 1162.610011 | 13.000000 |
| 183 | 113 | 3 | 1.000000 | 3.000000 | 21 | 2.110150 | 530.051600 | 7.000000 |
| 214 | 204 | 2 | 1.000000 | 2.000000 | 32 | 2.104687 | 967.735335 | 16.000000 |
| 42 | 93 | 2 | 1.000000 | 2.000000 | 77 | 2.249535 | 708.836782 | 38.500000 |
| 50 | 75 | 2 | 1.000000 | 2.000000 | 157 | 168.026310 | 815.379580 | 78.500000 |
| 112 | 288 | 3 | 1.000000 | 3.000000 | 122 | 7.256865 | 1750.238084 | 40.666667 |
| 118 | 116 | 6 | 1.000000 | 6.000000 | 127 | 9.783703 | 1037.600532 | 21.166667 |
| 119 | 310 | 6 | 1.000000 | 6.000000 | 301 | 19.163627 | 2224.329532 | 50.166667 |
| 122 | 79 | 4 | 1.000000 | 4.000000 | 55 | 3.132316 | 426.619441 | 13.750000 |
| 125 | 79 | 2 | 1.000000 | 2.000000 | 47 | 1.905456 | 508.236391 | 23.500000 |
| 134 | 136 | 3 | 1.000000 | 3.000000 | 52 | 50.636128 | 1394.478052 | 17.333333 |
| 217 | 125 | 2 | 1.000000 | 2.000000 | 208 | 7.458934 | 1223.777968 | 104.000000 |
| 137 | 470 | 5 | 1.000000 | 5.000000 | 107 | 169.066857 | 2436.750095 | 21.400000 |
| 163 | 126 | 2 | 1.000000 | 2.000000 | 50 | 2.284440 | 953.708909 | 25.000000 |
| 164 | 128 | 2 | 1.000000 | 2.000000 | 21 | 1.613390 | 617.896763 | 10.500000 |
| 168 | 114 | 4 | 1.000000 | 4.000000 | 102 | 4.653435 | 757.820136 | 25.500000 |
| 173 | 82 | 3 | 1.000000 | 3.000000 | 16 | 1.942744 | 375.557418 | 5.333333 |
| 177 | 61 | 2 | 1.000000 | 2.000000 | 28 | 1.562266 | 351.101473 | 14.000000 |
| 179 | 205 | 3 | 1.000000 | 3.000000 | 200 | 6.752881 | 1670.695128 | 66.666667 |
| 185 | 104 | 4 | 1.000000 | 4.000000 | 28 | 2.594351 | 507.347868 | 7.000000 |
| 211 | 64 | 3 | 1.000000 | 3.000000 | 60 | 2.342050 | 376.933060 | 20.000000 |
| 139 | 309 | 3 | 1.000000 | 3.000000 | 104 | 86.640553 | 2097.022142 | 34.666667 |
| 270 | 323 | 5 | 1.000000 | 5.000000 | 128 | 10.667736 | 1983.542745 | 25.600000 |

ML classifier score:

Mean of means: 94.13%

Median of means: 98.31%

Weighted mean of means: 94.35%

********* More Details of Sites Where ML Classification Has Been Used ********

| | bssids | codecs | mean__accuracy | mean__accuracy__weighted |
|---|---|---|---|---|
| count | 70.000000 | 70.000000 | 70.000000 | 70.000000 |
| mean | 289.057143 | 8.085714 | 0.941332 | 7.628501 |
| std | 891.644953 | 25.220617 | 0.088855 | 23.999285 |
| min | 33.000000 | 2.000000 | 0.653846 | 1.333333 |
| 25% | 84.250000 | 2.000000 | 0.916667 | 2.000000 |
| 50% | 119.000000 | 3.000000 | 0.983097 | 3.000000 |
| 75% | 231.250000 | 6.000000 | 1.000000 | 5.972727 |
| max | 7518.000000 | 212.000000 | 1.000000 | 201.774920 |

| | measurements | process__time__ classify__ms | process__time__create__ data__ms |
|---|---|---|---|
| count | 70.000000 | 70.000000 | 70.000000 |
| mean | 183.671429 | 440.587749 | 2505.895285 |
| std | 496.992337 | 3423.805362 | 10181.342504 |
| min | 7.000000 | 1.416268 | 158.522324 |
| 25% | 39.000000 | 2.249549 | 530.643743 |
| 50% | 91.500000 | 7.130338 | 879.688023 |
| 75% | 169.500000 | 26.376794 | 1634.625174 |
| max | 4145.000000 | 28672.237437 | 85821.556402 |

| | num__meas__ratio |
|---|---|
| count | 70.000000 |
| mean | 25.665383 |
| std | 21.003028 |
| min | 3.500000 |
| 25% | 14.083333 |

-continued

| | num_meas_ratio |
|---|---|
| 50% | 20.250000 |
| 75% | 28.517857 |
| max | 106.500000 |

Press Enter to quit

One alternative approach to using disjoint wireless access zone segmentation may involve identifying one or more labeled fingerprints (e.g., characteristic Wi-Fi vectors) per collaboration endpoint. These labeled fingerprints may be compared with the unlabeled fingerprint(s) to determine their similarity. This approach may be less complex to implement than disjoint wireless access zone segmentation.

Figure 6:
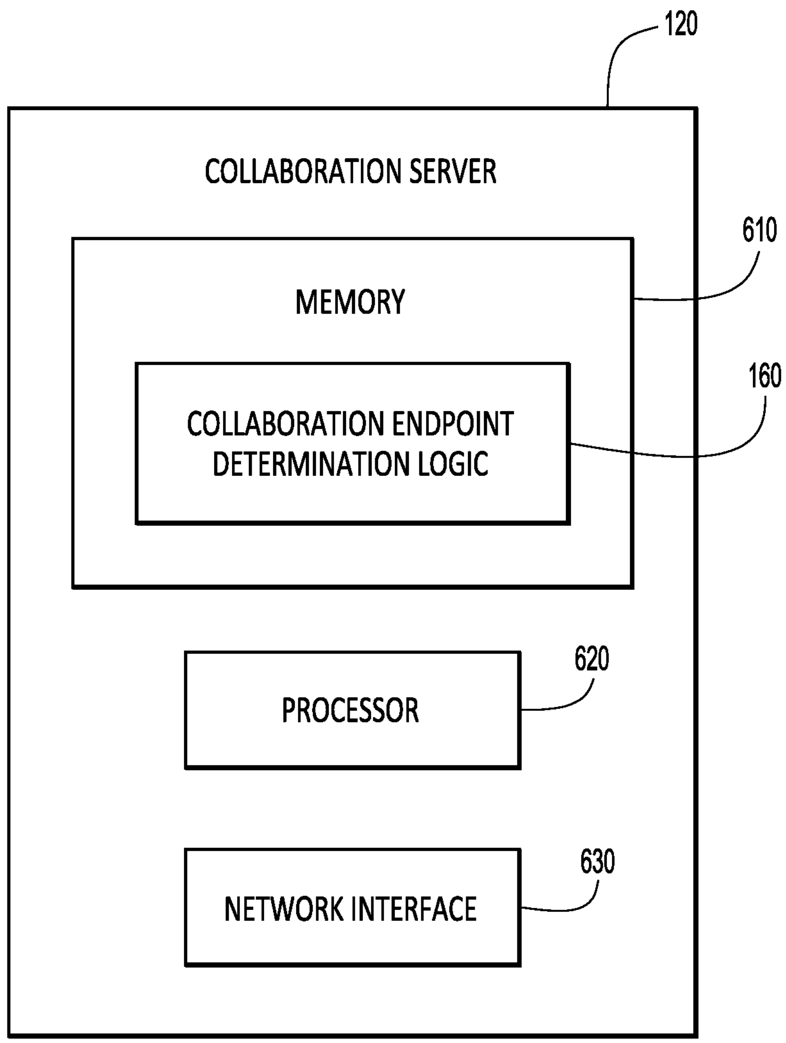
FIG. 6 is a block diagram of a collaboration server configured to automatically connect ultrasound-incapable client devices to collaboration endpoints, according to an example embodiment.

FIG. 6 is a simplified block diagram of collaboration server 120. In this example, collaboration server 120 includes a memory 610 that stores the collaboration endpoint determination logic 160, one or more processors 620, and a network interface 630. The one or more processors 620 are configured to execute instructions stored in the memory 610 for the collaboration endpoint determination logic 160. When executed by the one or more processors 620, the collaboration endpoint determination logic 160 causes the collaboration server 120 to perform operations described herein. The network interface 630 is a network interface card (or multiple instances of such a device) or other network interface device that enables network communications on behalf of the collaboration server 120 for sending and receiving messages as described above.

The memory 610 may be read only memory (ROM), random access memory (RAM), magnetic disk storage media devices, optical storage media devices, flash memory devices, electrical, optical, or other physical/tangible memory storage devices. Thus, in general, the memory 610 may be one or more tangible (non-transitory) computer readable storage media (e.g., a memory device) encoded with software comprising computer executable instructions and when the software is executed (by processor 620) it is operable to perform the operations described herein.

Figure 7:
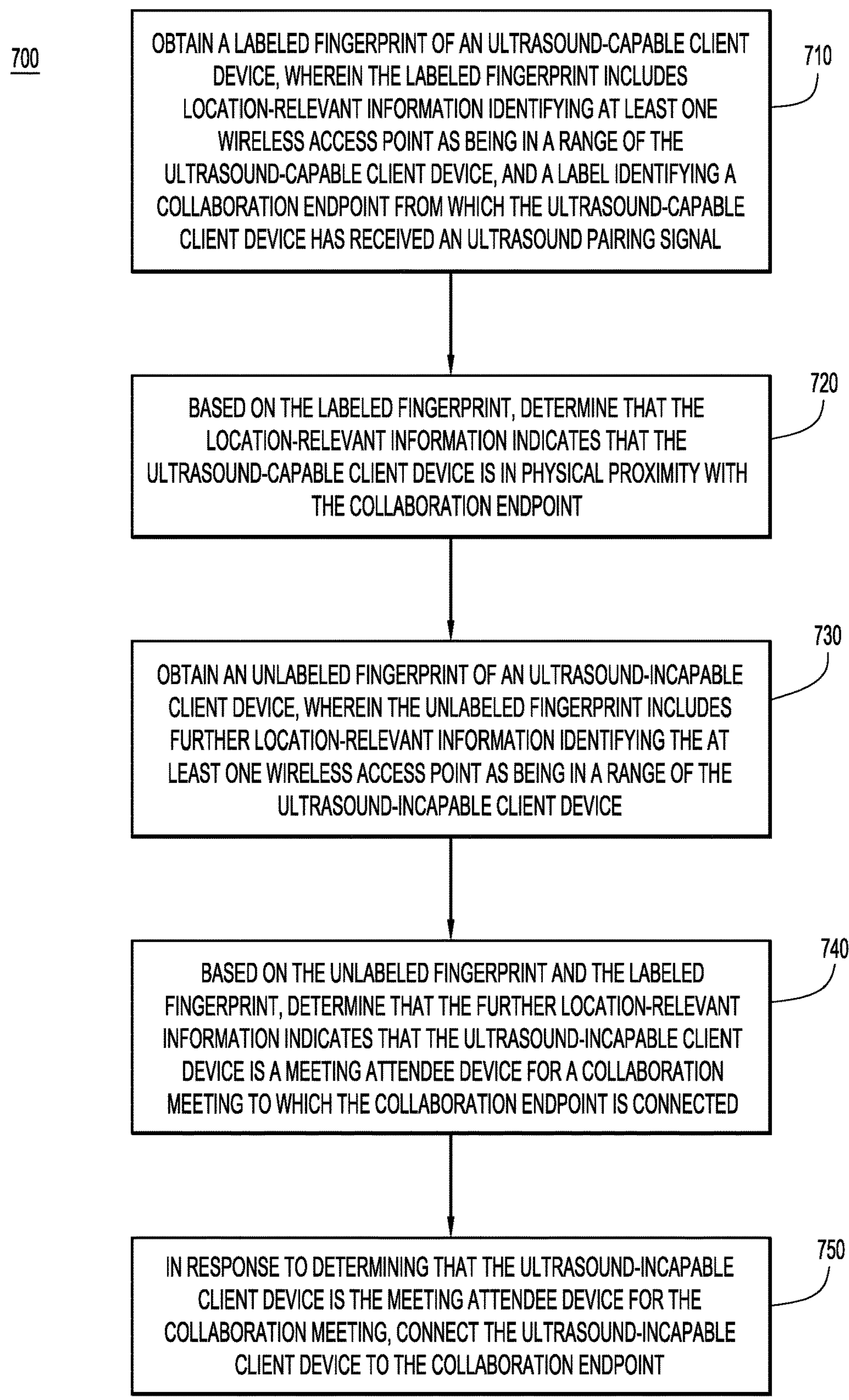
FIG. 7 is a flowchart illustrating a method for automatically connecting ultrasound-incapable client devices to collaboration endpoints, according to an example embodiment.

FIG. 7 is a flowchart of an example method 700 for connecting ultrasound-incapable client devices to collaboration devices. The method 700 may be performed by a server (e.g., collaboration server 120). At 710, the server obtains a labeled fingerprint of an ultrasound-capable client device, wherein the labeled fingerprint includes location-relevant information identifying at least one wireless access point as being in a range of the ultrasound-capable client device, and a label identifying a collaboration endpoint from which the ultrasound-capable client device has received an ultrasound pairing signal. At 720, based on the labeled fingerprint, the server determines that the location-relevant information indicates that the ultrasound-capable client device is in physical proximity with the collaboration endpoint.

At 730, the server obtains an unlabeled fingerprint of an ultrasound-incapable client device, wherein the unlabeled fingerprint includes further location-relevant information identifying the at least one wireless access point as being in a range of the ultrasound-incapable client device. At 740, based on the unlabeled fingerprint and the labeled fingerprint, the server determines that the further location-relevant information indicates that the ultrasound-incapable client device is a meeting attendee device for a collaboration meeting to which the collaboration endpoint is connected. At 750, in response to determining that the ultrasound-incapable client device is the meeting attendee device for the collaboration meeting, the server connects the ultrasound-incapable client device to the collaboration endpoint.

Techniques presented herein address the problem of establishing physical proximity between a mobile client device and an installed collaboration endpoint. The absolute physical location of the mobile client device (e.g., in an x-y plane) is not necessary to resolve this problem; instead, the relative proximity of the mobile client device to the installed collaboration endpoint is determined using the automated collection of labeled fingerprints. The labeled fingerprints may help build a data foundation for a machine learning process to identify a collaboration endpoint at a large scale. One advantage to this approach is that ultrasound-capable client devices may report labeled fingerprint data that will ultimately be used to help ultrasound-incapable client devices establish proximity with a collaboration endpoint.

In one form, a method is provided. The method comprises: obtaining a labeled fingerprint of an ultrasound-capable client device, wherein the labeled fingerprint includes location-relevant information identifying at least one wireless access point as being in a range of the ultrasound-capable client device, and a label identifying a collaboration endpoint from which the ultrasound-capable client device has received an ultrasound pairing signal; based on the labeled fingerprint, determining that the location-relevant information indicates that the ultrasound-capable client device is in physical proximity with the collaboration endpoint; obtaining an unlabeled fingerprint of an ultrasound-incapable client device, wherein the unlabeled fingerprint includes further location-relevant information identifying the at least one wireless access point as being in a range of the ultrasound-incapable client device; based on the unlabeled fingerprint and the labeled fingerprint, determining that the further location-relevant information indicates that the ultrasound-incapable client device is a meeting attendee device for a collaboration meeting to which the collaboration endpoint is connected; and in response to determining that the ultrasound-incapable client device is the meeting attendee device for the collaboration meeting, connecting the ultrasound-incapable client device to the collaboration endpoint.

In another form, an apparatus is provided. The apparatus comprises: a network interface configured to: obtain a labeled fingerprint of an ultrasound-capable client device, wherein the labeled fingerprint includes location-relevant information identifying at least one wireless access point as being in a range of the ultrasound-capable client device, and a label identifying a collaboration endpoint from which the ultrasound-capable client device has received an ultrasound pairing signal; and obtain an unlabeled fingerprint of an ultrasound-incapable client device, wherein the unlabeled fingerprint includes further location-relevant information identifying the at least one wireless access point as being in a range of the ultrasound-incapable client device; and a processor coupled to the network interface, wherein the processor is configured to: based on the labeled fingerprint, determine that the location-relevant information indicates that the ultrasound-capable client device is in physical proximity with the collaboration endpoint; based on the unlabeled fingerprint and the labeled fingerprint, determining that the further location-relevant information indicates that the ultrasound-incapable client device is a meeting attendee device for a collaboration meeting to which the collaboration endpoint is connected; and in response to determining that the ultrasound-incapable client device is the meeting attendee device for the collaboration meeting, connect the ultrasound-incapable client device to the collaboration endpoint.

In still another form, one or more non-transitory computer readable storage media are provided. The one or more non-transitory computer readable storage media are encoded with instructions that, when executed by a processor, cause the processor to: obtain a labeled fingerprint of an ultrasound-capable client device, wherein the labeled fingerprint includes location-relevant information identifying at least one wireless access point as being in a range of the ultrasound-capable client device, and a label identifying a collaboration endpoint from which the ultrasound-capable client device has received an ultrasound pairing signal; based on the labeled fingerprint, determine that the location-relevant information indicates that the ultrasound-capable client device is in physical proximity with the collaboration endpoint; obtain an unlabeled fingerprint of an ultrasound-incapable client device, wherein the unlabeled fingerprint includes further location-relevant information identifying the at least one wireless access point as being in a range of the ultrasound-incapable client device; based on the unlabeled fingerprint and the labeled fingerprint, determine that the further location-relevant information indicates that the ultrasound-incapable client device is a meeting attendee device for a collaboration meeting to which the collaboration endpoint is connected; and in response to determining that the ultrasound-incapable client device is the meeting attendee device for the collaboration meeting, connect the ultrasound-incapable client device to the collaboration endpoint.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

obtaining a labeled fingerprint of an ultrasound-capable client device, wherein the labeled fingerprint includes location-relevant information identifying at least one wireless access point as being in a range of the ultrasound-capable client device, and a label identifying a collaboration endpoint from which the ultrasound-capable client device has received an ultrasound pairing signal;

based on the labeled fingerprint, determining that the location-relevant information indicates that the ultrasound-capable client device is in physical proximity with the collaboration endpoint;

obtaining an unlabeled fingerprint of an ultrasound-incapable client device, wherein the unlabeled fingerprint includes further location-relevant information identifying the at least one wireless access point as being in a range of the ultrasound-incapable client device;

based on the unlabeled fingerprint and the labeled fingerprint, determining that the further location-relevant information indicates that the ultrasound-incapable client device is a meeting attendee device for a collaboration meeting to which the collaboration endpoint is connected; and in response to determining that the ultrasound-incapable client device is the meeting attendee device for the collaboration meeting, connecting the ultrasound-incapable client device to the collaboration endpoint.

2. The method of claim 1, wherein the location-relevant information includes an estimate of a distance between the ultrasound-capable client device and the collaboration endpoint.

3. The method of claim 1, wherein the location-relevant information includes a timestamp indicating a time at which the labeled fingerprint was sent.

4. The method of claim 3, further comprising:

based on the timestamp, determining whether the labeled fingerprint was sent at a beginning of the collaboration meeting, a middle of the collaboration meeting, or an end of the collaboration meeting;

if it is determined that the labeled fingerprint was sent at the beginning of the collaboration meeting or at the end of the collaboration meeting, assigning the location-relevant information a first weight; and if it is determined that the labeled fingerprint was sent at the middle of the collaboration meeting, assigning the location-relevant information a second weight, wherein the first weight is less than the second weight.

5. The method of claim 1, wherein the location-relevant information includes a user identifier associated with a user of the ultrasound-capable client device, the method further comprising:

based on the user identifier, determining that the user and the collaboration endpoint have been invited to the collaboration meeting.

6. The method of claim 1, further comprising:

obtaining a second labeled fingerprint of the collaboration endpoint, wherein the second labeled fingerprint includes location-relevant information of the collaboration endpoint, and a second label identifying the collaboration endpoint; and based on the second labeled fingerprint, determining that the ultrasound-incapable client device is the meeting attendee device for the collaboration meeting to which the collaboration endpoint is connected.

7. The method of claim 1, further comprising:

determining that the ultrasound-capable client device and the collaboration endpoint are located in a disjoint wireless access zone; and determining that the ultrasound-incapable client device is the meeting attendee device based on determining that the ultrasound-capable client device and the collaboration endpoint are located in the disjoint wireless access zone.

8. The method of claim 1, further comprising:

sending, to the ultrasound-incapable client device, an indication of a plurality of collaboration endpoints including the collaboration endpoint;

obtaining, from the ultrasound-incapable client device, a user selection of the collaboration endpoint; and based on the user selection of the collaboration endpoint, determining that a second ultrasound-incapable client device is a meeting attendee device for a subsequent collaboration meeting to which the collaboration endpoint is connected.

9. The method of claim 1, wherein the location-relevant information includes an indication that the collaboration endpoint acts as a wireless transmitter.

10. An apparatus comprising:

a network interface configured to:

obtain a labeled fingerprint of an ultrasound-capable client device, wherein the labeled fingerprint includes location-relevant information identifying at least one wireless access point as being in a range of the ultrasound-capable client device, and a label identifying a collaboration endpoint from which the ultrasound-capable client device has received an ultrasound pairing signal; and obtain an unlabeled fingerprint of an ultrasound-incapable client device, wherein the unlabeled fingerprint includes further location-relevant information identifying the at least one wireless access point as being in a range of the ultrasound-incapable client device; and a processor coupled to the network interface, wherein the processor is configured to:

based on the labeled fingerprint, determine that the location-relevant information indicates that the ultrasound-capable client device is in physical proximity with the collaboration endpoint;

based on the unlabeled fingerprint and the labeled fingerprint, determine that the further location-relevant information indicates that the ultrasound-incapable client device is a meeting attendee device for a collaboration meeting to which the collaboration endpoint is connected; and in response to determining that the ultrasound-incapable client device is the meeting attendee device for the collaboration meeting, connect the ultrasound-incapable client device to the collaboration endpoint.

11. The apparatus of claim 10, wherein the location-relevant information includes an estimate of a distance between the ultrasound-capable client device and the collaboration endpoint.

12. The apparatus of claim 10, wherein the location-relevant information includes a timestamp indicating a time at which the labeled fingerprint was sent.

13. The apparatus of claim 12, wherein the processor is further configured to:

based on the timestamp, determine whether the labeled fingerprint was sent at a beginning of the collaboration meeting, a middle of the collaboration meeting, or an end of the collaboration meeting;

if it is determined that the labeled fingerprint was sent at the beginning of the collaboration meeting or at the end of the collaboration meeting, assign the location-relevant information a first weight; and if it is determined that the labeled fingerprint was sent at the middle of the collaboration meeting, assign the location-relevant information a second weight, wherein the first weight is less than the second weight.

14. The apparatus of claim 10, wherein the location-relevant information includes a user identifier associated with a user of the ultrasound-capable client device, the processor further configured to:

based on the user identifier, determine that the user and the collaboration endpoint have been invited to the collaboration meeting.

15. The apparatus of claim 10, wherein:

the network interface is further configured to obtain a second labeled fingerprint of the collaboration endpoint, wherein the second labeled fingerprint includes location-relevant information of the collaboration endpoint, and a second label identifying the collaboration endpoint; and the processor is further configured to, based on the second labeled fingerprint, determine that the ultrasound-incapable client device is the meeting attendee device for the collaboration meeting to which the collaboration endpoint is connected.

16. The apparatus of claim 10, wherein:

the network interface is further configured to:

send, to the ultrasound-incapable client device, an indication of a plurality of collaboration endpoints including the collaboration endpoint; and obtain, from the ultrasound-incapable client device, a user selection of the collaboration endpoint; and the processor is further configured to:

based on the user selection of the collaboration endpoint, determine that a second ultrasound-incapable client device is a meeting attendee device for a subsequent collaboration meeting to which the collaboration endpoint is connected.

17. One or more non-transitory computer readable storage media encoded with instructions that, when executed by a processor, cause the processor to:

obtain a labeled fingerprint of an ultrasound-capable client device, wherein the labeled fingerprint includes location-relevant information identifying at least one wireless access point as being in a range of the ultrasound-capable client device, and a label identifying a collaboration endpoint from which the ultrasound-capable client device has received an ultrasound pairing signal;

based on the labeled fingerprint, determine that the location-relevant information indicates that the ultrasound-capable client device is in physical proximity with the collaboration endpoint;

obtain an unlabeled fingerprint of an ultrasound-incapable client device, wherein the unlabeled fingerprint includes further location-relevant information identifying the at least one wireless access point as being in a range of the ultrasound-incapable client device;

based on the unlabeled fingerprint and the labeled fingerprint, determine that the further location-relevant information indicates that the ultrasound-incapable client device is a meeting attendee device for a collaboration meeting to which the collaboration endpoint is connected; and in response to determining that the ultrasound-incapable client device is the meeting attendee device for the collaboration meeting, connect the ultrasound-incapable client device to the collaboration endpoint.

18. The one or more non-transitory computer readable storage media of claim 17, wherein the location-relevant information includes an estimate of a distance between the ultrasound-capable client device and the collaboration endpoint.

19. The one or more non-transitory computer readable storage media of claim 17, wherein the location-relevant information includes a timestamp indicating a time at which the labeled fingerprint was sent.

20. The one or more non-transitory computer readable storage media of claim 19, wherein the instructions further cause the processor to:

based on the timestamp, determine whether the labeled fingerprint was sent at a beginning of the collaboration meeting, a middle of the collaboration meeting, or an end of the collaboration meeting;

if it is determined that the labeled fingerprint was sent at the beginning of the collaboration meeting or at the end of the collaboration meeting, assign the location-relevant information a first weight; and if it is determined that the labeled fingerprint was sent at the middle of the collaboration meeting, assign the location-relevant information a second weight, wherein the first weight is less than the second weight.

* * * * *